United States Patent [19]
Cripe

[11] Patent Number: 5,327,337
[45] Date of Patent: Jul. 5, 1994

[54] RESONANT PUSH-PULL SWITCHING POWER AMPLIFIER

[75] Inventor: David W. Cripe, Quincy, Ill.

[73] Assignee: Broadcast Electronics, Inc., Quincy, Ill.

[21] Appl. No.: 937,700

[22] Filed: Sep. 1, 1992

[51] Int. Cl.[5] .......................................... H02M 3/337
[52] U.S. Cl. ...................... 363/134; 363/24; 363/97
[58] Field of Search ........................ 363/134, 24, 97

[56] References Cited

U.S. PATENT DOCUMENTS

| | | | |
|---|---|---|---|
| 3,919,656 | 11/1975 | Sokal et al. | 330/51 |
| 4,186,434 | 1/1980 | Cowett | 363/24 |
| 4,542,440 | 9/1985 | Chetty et al. | 363/24 |
| 4,553,199 | 11/1985 | Harada et al. | 363/24 |
| 4,860,184 | 8/1989 | Tabisz et al. | 363/98 |
| 4,893,227 | 1/1990 | Gallios et al. | 363/26 |
| 4,982,314 | 1/1991 | Miki | 363/134 |
| 5,055,993 | 10/1991 | Miyata et al. | 363/98 |
| 5,140,512 | 8/1992 | O'Sullivan | 363/24 |
| 5,162,981 | 11/1992 | Lazar et al. | 363/24 |
| 5,218,522 | 6/1993 | Phelps et al. | 363/124 |

FOREIGN PATENT DOCUMENTS

| | | | |
|---|---|---|---|
| 2512289 | 3/1982 | France | 363/97 |
| 0142173 | 9/1982 | Japan | 363/24 |
| 0191485 | 10/1984 | Japan | 363/134 |

OTHER PUBLICATIONS

"Low—power inverter ignites gas—discharge lamps", by A. Kanid, Electronics, vol. 54, No. 1, Jan. 13, 1981.
"Resonant Zero Crossover DC-TO-DC Converter", by R. Carlsten, IBM Technical Disclosure Bulletin, vol. 22, No. 8B, Jan. 1980.
"400 Volt, 60 Watt Push-Pull Power Supply", Siliconix Inc. Mospower Applications Manual, 1984.

Primary Examiner—Thomas M. Dougherty
Attorney, Agent, or Firm—Hill, Steadman & Simpson

[57] ABSTRACT

A highly efficient, tuned, switching power amplifier has components in a circuit configuration which minimizes switching losses and stored energy within the circuit. The circuit includes a pair of switches operating at the carrier frequency at substantially 50% duty. The switches are coupled through a transformer to a load, with the circuit being tuned, taking the particular load into account, so as to minimize the power loss in the switches by ensuring that immediately prior to, and during each, transition of each switch from its non-conducting (off) state to its conducting (on) state, both the voltage across the switch and the first derivative with respect to time of the voltage across the switch are substantially zero.

2 Claims, 1 Drawing Sheet

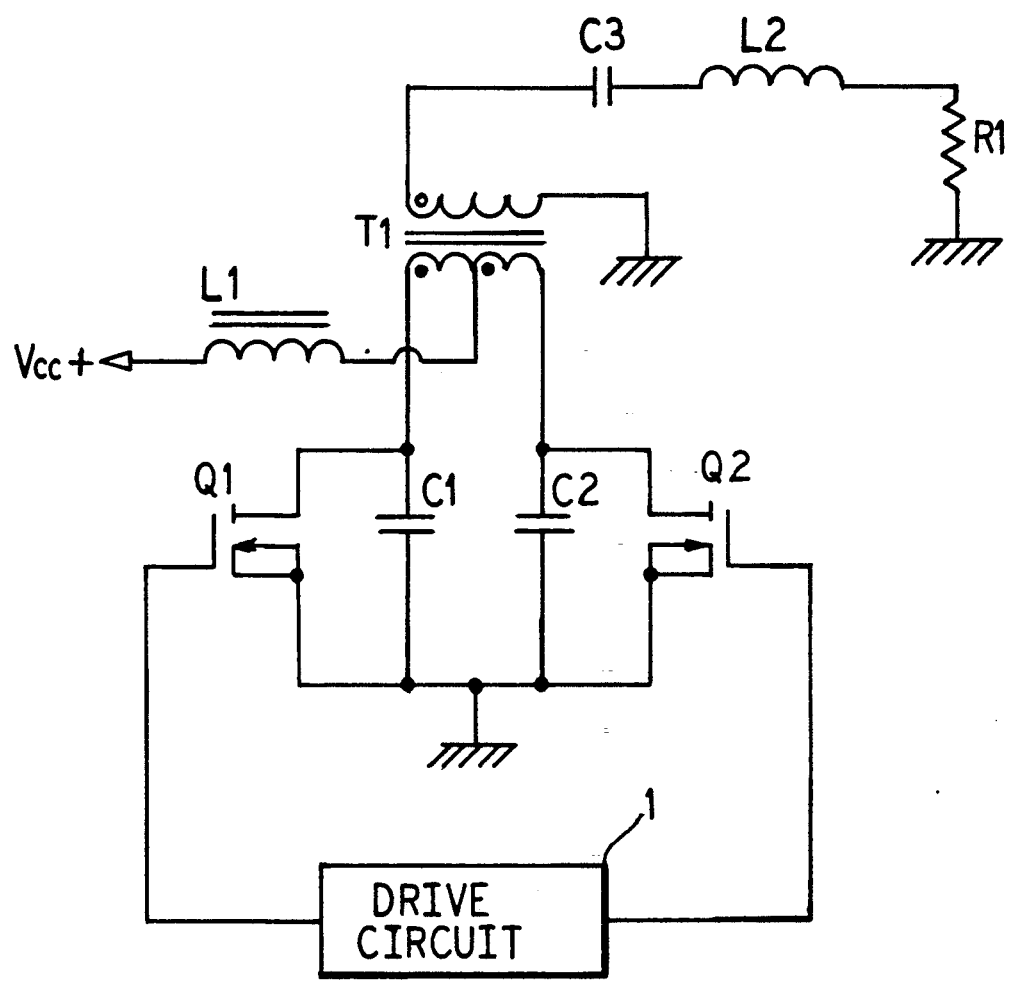

RESONANT PUSH-PULL SWITCHING POWER AMPLIFIER

BACKGROUND OF THE INVENTION

1. Field of the Invention

The present invention relates to switching power amplifier circuits connected for operating in a push-pull manner and tuned, given the presence of a particular circuit load, to minimize switching losses.

2. Description of the Prior Art

In the design of switching power amplifiers, the number of amplifying devices required to generate a given quantity of power is dictated by the conversion efficiency of the devices within the circuit. A more highly efficient power amplification circuit can be made smaller, simpler, and less expensive than a less efficient circuit which produces the same output power. The selection of the amplifying device is primarily determined by the intended frequency of operation, and the cost of devices which are available that meet the electrical criteria. In general, for each watt of power handling capacity, a slower switching device, such as an SCR, is less expensive than a faster switching device, such as a MOSFET, and silicon devices are less costly than GaAs devices. The maximum frequency at which a device can operate is the frequency at which the switching losses become a major part of the overall device losses. Therefore, it is, in theory, most cost effective for the designer to utilize a circuit configuration in which the amplified device is connected which minimizes the switching losses of the amplifying device.

A type of power amplifier operation is described in U.S. Pat. No. 3,919,656 (Sokol et al.), which exemplifies an amplifier class known in the art as Class E operation. Class E operation reduces switching losses of the amplifying device to substantially zero, resulting in close to 100% power amplifier efficiency, and also allows a given amplifying device to operate at a higher frequency than in non-resonant (Class D) switching circuits.

SUMMARY OF THE INVENTION

It is an object of the present invention to provide an improved Class E switching power amplifier circuit which preserves the high operating efficiency typified by Class E power amplification while reducing the amount of energy which is stored in the circuit as compared to conventional Class E power amplification circuits.

It is a further object of the present invention to utilize the reduction in stored energy to reduce the size of the capacitors and inductors in the circuit, compared to values for such components in conventional Class E circuits.

A further object of the present invention is to provide a high power amplifier circuit having a design compatible for use with conventional solid-state elements.

Another object of the present invention is to provide such an amplifier circuit having reduced output filtering requirements.

The above objects are achieved in accordance with the principles of the present invention in a circuit arrangement of the tuned-switching type having two active device switches, each switch having a low-impedance conducting (on) state and a high impedance non-conducting (off) state, and each switching device having one terminal connected to a common circuit point. The switches are driven so as to be alternatingly off and on at substantially 50% duty, so that generally when one switch is in its low impedance state, the other switch is in its high impedance state, and vice versa. Each switching device has a controlled signal path, and these controlled signal paths are respectively connected to the two terminals of a primary winding of a coupling transformer. The terminals of the secondary winding of the coupling transformer form the output for the circuit, to which a load is to be connected. D.C. power is supplied to the circuit across a center cap of primary of the coupling transformer and the aforementioned common connection point of the switching devices.

The controlled path of each switching device has a capacitance connected in parallel therewith, the capacitances being of equal value. These respective capacitances can be formed by discrete components, or may be composed entirely of the internal capacitance of the respective switching device.

It is assumed that the load can be represented by a combination of resistive, inductive and capacitive values. For a given load for a particular application of the circuit, values are selected for the circuit components including the coupling transformer and the switching capacitances, so as to create a resonant circuit, in combination with the load, having impedances which generate specific waveforms at the switches. These waveforms are such that the voltage across each switch at the end of its off state is substantially zero, the voltage across each switch is substantially zero during the time that switch is in transition from the off state to the on state, and the first derivative with respect to time of the voltage across that switch is substantially zero at the end of the off state.

If necessary, an inductive device for substantially limiting the flow of alternating current from the d.c. power source to zero can be provided as a series-connected component between the center tap of the primary winding of the coupling transformer and the d.c. power source.

Specific formulae for selecting the proper circuit component values are described in detail below.

DESCRIPTION OF THE DRAWING

The single FIGURE is a circuit diagram showing a switching power amplifier circuit arrangement constructed in accordance with the principles of the present invention, connected to a load represented by a resistance, a capacitance and an inductance.

DESCRIPTION OF THE PREFERRED EMBODIMENTS

The circuit shown in the drawing is representative of the functional elements of the switching power amplifier circuit in accordance with the principles of the present invention. The circuit includes amplifying devices Q1 and Q2. These are shown in the drawing, for exemplary purposes, as MOSFET devices, however, the amplifying devices may be any controllable switching devices, such as bipolar transistors, SCRs, vacuum tubes, etc. The switching action of these devices may, of course, be non-ideal, i.e., the "on" (conducting) state resistance may be non-zero, or a non-zero saturation voltage may be present. Moreover, the transition times between the switching states may be non-zero.

A low-level carrier input signal, and its negative phase complement are supplied from a drive circuit 1 to drive the switches (amplifying devices) Q1 and Q2 at a nominal 50% duty and 180° out of phase, so that when one amplifying device is on, the other device is off, and vice versa.

Each switch Q1 and Q2 has a controlled path across the switch. One end of each controlled path is connected to a common circuit point, such as ground as shown in the drawing. The other ends of the controlled paths are respectively connected to the two terminals of a primary winding of a coupling transformer T1. This primary winding of the transformer T1 is center-tapped, with the center tap being connected to the circuit power source+Vcc. If necessary, this connection can take place through an RF choke L1 so as to limit substantially to zero the flow of alternating current from the d.c. power source.

As the switches Q1 and Q2 alternatingly conduct, d.c. power is supplied through L1, through alternate halves of the primary winding of the transformer T1, and is thereby converted into a.c. power. This power is coupled through the transformer T1 to the intended load circuit.

In the drawing, the load circuit, which is connected across the terminals of the secondary winding of the transformer T1, is represented by a resistance R1, an inductance L2 and a capacitance C3. Of course, the load may contain many discrete components connected in various configurations, however, it is assumed that the collective impedance of all of these components can be represented by the components shown in the drawing, with suitably calculated values. It should also be noted that, as described below, although the values of the load as represented by R1, L2 and C3 unavoidably enter into the selection of the component values for the operating circuit in order to obtain the desired tuning, the load does not form a part of the inventive circuit per se. Typically, for a circuit designer, the load will be a "given" factor, and the circuit component values will then be selected taking this factor into account.

The switches Q1 and Q2 respectively have capacitances associated therewith, schematically shown in the drawing as respective capacitances C1 and C2 shunting the controlled paths of Q1 and Q2. The capacitances C1 and C2 may be discrete components, or may be composed entirely of the internal switching capacitances of the respective switches Q1 and Q2.

The network formed by the capacitances C1 and C2, the inductance L1 (if present) and the load is tuned so that, at the fundamental frequency of the output signal supplied to the load, this network possesses a specific input impedance, as determined by the formulae described below. Since the values of the load components R1, L2 and C3 are given, this is accomplished by appropriate selection of the values of the amplifier circuit. To the harmonics of the fundamental frequency, this network must present an impedance having a magnitude which is substantially greater than the impedance of the network at the fundamental.

In order to minimize the switching losses of the switches (amplifying devices) Q1 and Q2, the network formed by C1, C2, C3, L2 and R1 must have impedances to create waveforms across the respective switches Q1 and Q2 substantially as shown in FIGS. 2A and 2B of the aforementioned U.S. Pat. No. 3,919,656. Particular concern must be paid to the instant prior to each switch entering its conductive state. At this time, both the voltage across the particular switch, and the first derivative with respect to time of that voltage should be substantially zero.

The relevant component values are selected according to the following relationships, the first being $$R1 = (n^2 Vcc^2)/(0.57\, m^2 P),$$

wherein R1 is the resistive component of the load at the fundamental frequency, Vcc is the supply voltage, n is the number of turns of the primary of the transformer T1, m is the number of turns of the secondary of the transformer T1, and P is the desired output power. These values can be selected, if the resistive component of the load R1 is already fixed, by manipulating the factors on the right side of the equation. Alternatively, in some instances, it may be possible to select or adjust the resistive component of the load within limits, in which case a desired output power may be first selected, and the resistive component of the load adjusted accordingly so as to achieve that desired output power.

In any event, once R1 has been determined, the, equivalent input reactance $Z_{input}$ at the fundamental frequency of the load, depicted in the drawing as the series combination of C3, L2 and R1, is determined by the relationship $$Z_{input} = 1.2 \cdot R1.$$

The capacitance values for the circuit are then set according to the relationship:

$$C1 = (0.0386)/(f \cdot R1),$$

wherein f is the fundamental frequency. As noted above, C1=C2. If the inductance L1 is used, this component must have a value which satisfies the relationship $$L1 > (2Vcc^2)/(f \cdot P).$$

Due to the push-pull nature of the circuit disclosed herein, the second harmonic component of the output waveform is substantially zero, and in practice, second harmonic levels 40 to 50 dB below the carrier are easily achieved. In the single-ended circuit disclosed in the aforementioned U.S. Pat. No. 3,919,656, by contrast, the second harmonic is typically 15 dB below the fundamental frequency, as measured at the drain of the switching device. This means that for a designer seeking to use a circuit of this type in, for example, a transmitter, the degree of filtering required to attenuate the second harmonic to a given level will be correspondingly less than for the conventional single-ended circuit exemplified by U.S. Pat. No. 3,919,656. Thus the circuit constructed in accordance with the principles of the present invention can be reduced in size, and the complexity of the filtering network will also be reduced.

Since the RF choke L1 in the inventive circuit is connected to the center tap of the transformer T1, rather than this center tap being connected directly to the drain of the switching device as in the single-ended circuit of U.S. Pat. No. 3,919,656, the RF waveform across L1 is double the fundamental frequency, and has half the peak-to-peak voltage as that which occurs in the single-ended circuit. Consequently, the value L1 in the circuit disclosed herein can be approximately one-third that of the value of a comparable inductance in a single ended Class E circuit using an equivalent supply voltage and supplying equal power. If the power amplifier is part of an amplitude-modulated transmitter system, the choke L1 can be used as the final element of the pulse width (high level) modulator, low-pass filter. A lower value for this choke L1 can result in the availability of a higher envelope bandwidth as compared to that which is available in a single-ended circuit.

In order to enhance the bandwidth of any power amplifier circuit, the circuit Q (ratio of reactive impedance to resistive impedance) of the circuit connected to the load must be minimized. When, in a single-ended Class E circuit, the Q of the output network is reduced below approximately 5, the second harmonic current present in the load network will cause the peak and RMS current in the switching device, when conducting, to increase. This in turn increases the stresses experienced by the switching device. Because there is a negligible second harmonic present at the output of the push-pull circuit of the invention, this phenomenon does not occur. Consequently, for an output network of equivalent Q<5, the inventive circuit creates lower switching device stress than for comparable prior art circuitry.

The singled-ended Class E circuits described in U.S. Pat. No. 3,919,656 utilize a d.c. blocking capacitor to couple the RF energy to the load. In practice, high-current RF capacitors such as these are expensive, and are of limited availability. The circuit disclosed herein eliminates the requirement for any such d.c. blocking capacitor. Although the transformer T1 is present in the inventive circuit, and a transformer is not present in all embodiments of the Class E circuits described in U.S. Pat. No. 3,919,656, such a transformer will necessarily be present in any application wherein multiple power amplifier outputs are to be combined, since the use of a combining or coupling transformer is the standard technique for combining such outputs. A transformer will thus be present in the circuit regardless of the remainder of the circuit configuration. It should be noted, however, that there is no d.c. component which is present at the load capacitance C3 in accordance with the circuit of the invention.

In push-pull circuits of the Class D variety, particular care must be paid to assure that both switching devices of the inventive circuit do not conduct simultaneously, i.e., for more than 180° of a complete operational cycle. If such simultaneous conduction occurs, which is known as cross-conduction, the low impedance power source can deliver currents spikes through both devices, resulting in high energy dissipation and the likely destruction of the switching devices. In the inventive circuit, the phase angle during which each switch conducts can vary substantially from 180°, because during any period of simultaneous conduction of the two switches Q1 and Q2, the switching current is limited by the RF choke L1. Consequently, the exacting drive requirements for the Class D power amplifier are not present in the circuit constructed in accordance with the principles of the present invention.

Although modifications and changes may be suggested by those skilled in the art, it is the intention of the invertor to embody within the patent warranted hereon all changes and modifications as reasonably and properly come within the scope of his contribution to the art.

We claim as our invention:

1. An apparatus of the tuned switching type for generating alternating current output power, for use with a load representable as a series combination of a load capacitance, a load inductance and a load resistance, said apparatus comprising:

first and second active switching devices each having a low-impedance on state and a high-impedance off state and each having a controlled path having one end connected to a common circuit point;

means for driving said first and second switching devices between said on and off states in alternation at substantially 50% duty;

a coupling transformer having a primary winding with opposite ends respectively connected to the other ends of said controlled paths of said respective switching devices, said primary winding having a center tap, with a source of d.c. power being connectable across said center tap and said common circuit point, said transformer having a secondary winding forming an output of the apparatus, and across which an output signal is generated, and connectable to said load, said output signal having a fundamental frequency;

each controlled path of said first and second switching devices having a parallel capacitance associated therewith, the parallel capacitances of each of said first and second switching devices being equal, said parallel capacitances each having a value which is 0.0386 divided by the product of the fundamental frequency and said load resistance; and said coupling transformer and said parallel capacitances forming, in combination with said load, a resonant circuit means for creating respective waveforms across said first and second switches for causing the voltage across the controlled path of each switch at the end of said off state to be substantially zero, the voltage across the controlled path of each switch to be substantially zero during a time that switch is in transition from said off state to said on state, and for causing the first derivative with respect to time of the voltage across the controlled path of each switch to be substantially zero at the end of said off state.

2. An apparatus of the tuned switching type for generating alternating current output power, for use with a load representable as a series combination of a load capacitance, a load inductance and a load resistance, said apparatus comprising:

first and second active switching devices each having a low-impedance on state and a high-impedance off state and each having a controlled path having one end connected to a common circuit point;

means for driving said first and second switching devices between said on and off states in alternation at substantially 50% duty;

a coupling transformer having a primary winding with opposite ends respectively connected to the other ends of said controlled paths of said respective switching devices, said primary winding having a center tap, with a source of d.c. power being connectable across said center tap and said common circuit point, said transformer having a secondary winding forming an output of the apparatus, and across which an output signal is generated, and connectable to said load, said output signal having a fundamental frequency;

each controlled path of said first and second switching devices having a parallel capacitance associated therewith, the parallel capacitances of each of said first and second switching devices being equal;

an RF choke connected in series with said center tap of said primary winding of said coupling transformer, said RF choke having an inductance which is greater than twice the square of the voltage of said d.c. power source divided by the product of the fundamental frequency and the desired output power of said apparatus; and said coupling transformer and said parallel capacitances forming, in combination with said load, a resonant circuit means for creating respective waveforms across said first and second switches for causing the voltage across the controlled path of each switch at the end of said off state to be substantially zero, the voltage across the controlled path of each switch to be substantially zero during a time that switch is in transition from said off state to said on state, and for causing the first derivative with respect to time of the voltage across the controlled path of each switch to be substantially zero at the end of said off state.

* * * * *